United States Patent [19]

Sartori et al.

[11] 4,094,957

[45] June 13, 1978

[54] PROCESS FOR REMOVING ACID GASES WITH HINDERED AMINES AND AMINO ACIDS

[75] Inventors: Guido Sartori, Linden; David W. Savage, Summit, both of N.J.

[73] Assignee: Exxon Research & Engineering Co., Linden, N.J.

[21] Appl. No.: 750,520

[22] Filed: Dec. 14, 1976

[51] Int. Cl.$^2$ ............................................. B01D 53/34
[52] U.S. Cl. ................................... 423/223; 423/228; 423/229; 423/232; 423/234
[58] Field of Search ............... 423/220, 223, 232, 228, 423/226, 229, 234; 260/584 R

[56] References Cited

U.S. PATENT DOCUMENTS

| | | | |
|---|---|---|---|
| 2,139,122 | 12/1938 | Hass et al. | 260/584 R |
| 2,139,124 | 12/1938 | Hass et al. | 260/584 R |
| 3,848,057 | 11/1974 | Leder et al. | 423/228 |

*Primary Examiner*—Earl C. Thomas
*Attorney, Agent, or Firm*—Albert P. Halluin

[57] ABSTRACT

Acidic components are removed from gaseous mixtures by contacting the gaseous mixture with an aqueous solution comprising (1) a basic salt and (2) an activator for said basic salt comprising at least one sterically hindered amine and an aminoacid which is a cosolvent for the sterically hindered amines. The aminoacid serves to prevent phase separation of the aqueous solution at high temperatures and low fractional conversions during the contacting.

24 Claims, No Drawings

PROCESS FOR REMOVING ACID GASES WITH HINDERED AMINES AND AMINO ACIDS

BACKGROUND OF THE INVENTION

1. Field of the Invention

This invention relates to an improved process for removing acidic components from gaseous mixtures containing them and more particularly relates to a method for preventing phase separation of the basic aqueous scrubbing solution at high temperatures and low fractional conversions during the contacting steps.

2. Description of the Prior Art

It is well known in the art to treat gases and liquids, such as mixtures containing acidic gases including $CO_2$, $H_2S$, $SO_2$, $SO_3$, $CS_2$, HCN, COS and oxygen and sulfur derivatives of $C_1$ to $C_4$ hydrocarbons with amine solutions to remove these acidic gases. The amine usually contacts the acidic gases and the liquids as an aqueous solution containing the amine in an absorber tower with the aqueous amine solution contacting the acidic fluid countercurrently.

The acid scrubbing processes known in the art can be generally broken into three categories.

The first category is generally referred to as the aqueous amine process where relatively large amounts of amine solutions are employed during the absorption. This type of process is often utilized in the manufacture of ammonia where nearly complete removal of the acid gas, such as $CO_2$, is required. It is also used in those instances where an acid gas, such as $CO_2$, occurs with other acid gases or where the partial pressure of the $CO_2$ and other gases are low.

A second category is generally referred to as the aqueous base scrubbing process or "hot potash" process. In this type of process a small level of an amine is included as an activator for the aqueous base used in the scrubbing solution. This type of process is generally used where bulk removal of an acid gas, such as $CO_2$, is desired. This process also applies to situations where the $CO_2$ and feed gas pressures are high. In such processes, useful results are achieved using aqueous potassium carbonate solutions and an amine activator.

A third category is generally referred to as the nonaqueous solvent process. In this process, water is a minor constituent of the scrubbing solution and the amine is dissolved in the liquid phase containing the solvent. In this process, up to 50% of the amine is dissolved in the liquid phase. This type of process is utilized for specialized applications where the partial pressure of $CO_2$ is extremely high and/or where many acid gases are present, e.g., COS, $CH_3SH$ and $CS_2$.

The present invention pertains to an improved process for practicing the second category of acid scrubbing process described above, namely, the aqueous base scrubbing process or "hot potash" process. Many industrial processes for removal of acid gases, such as $CO_2$, use regenerable aqueous alkaline scrubbing solutions, such as an amine and potassium carbonate, which are continuously circulated between an absorption zone where acid gases are absorbed and a regeneration zone where they are desorbed usually by steam-stripping. The capital cost of these acid scrubbing processes is generally controlled by the size of the absorption and regeneration towers, the size of the reboilers for generating stripping steam, and the size of the condensers which condense spent stripping steam so that condensate may be returned to the system to maintain proper water balance. The cost of operating such scrubbing plants is generally related to the amount of heat required for the removal of a given amount of acid gas, e.g., thermal efficiency, sometimes expressed as cubic feet of acid gas removed per pound of steam consumed. Means for reducing the costs in operating these industrial processes have focused on the use of absorbing systems or combinations of chemical absorbents which will operate more efficiently and effectively in acid gas scrubbing processes using existing equipment.

There are a number of patents which describe improvements to improve the efficiency of the "hot potash" process. Some of these improvements are described below.

In U.S. Pat. No. 2,718,454, there is described a process for using potash and similar alkali metal salts in conjunction with amines, such as monoethanolamine, diethanolamine and triethanolamine to remove acid gases from a gas mixture. The combination of the alkali metal compounds in conjunction with the designated amine yields higher capacity for acid gases than systems with the amines alone.

In U.S. Pat. No. 3,144,301, there is disclosed the use of potassium carbonate in conjunction with diethanolamine and monoethanolamine to remove $CO_2$ from gaseous mixtures.

In U.S. Pat. Nos. 3,637,345, 3,793,434, and 3,848,057, processes for the removal of acid gases by means of aqueous carbonate scrubbing solutions activated by an amine, such as 1,6-hexanediamine, piperidine and their derivatives are described.

In U.S. Pat. No. 3,856,921, there is disclosed a process for removal of acid gases from fluids by use of a basic salt of an alkali or alkaline earth metal and an amine activator, such as 2-methylaminoethanol, 2-ethylaminoethanol, morpholine, pyrrolidine and derivatives thereof.

U.S. Pat. Nos. 3,563,695, 3,563,696, and 3,642,430 to Benson disclose processes for removing $CO_2$ and $H_2S$ from gasous mixtures by alkaline scrubbing processes wherein at least two separate regeneration zones are provided. Alkanolamines and aminoacids are described as activators, but the use of sterically hindered amines is not taught or disclosed in these patents.

Belgian Pat. No. 767,105 discloses a process for removing acid gases from gaseous streams by contacting the gaseous streams with a solution comprising potassium carbonate and an aminoacid, such as substituted glycines (e.g., N-isopropyl glycine, N-t-butylglycine, N-cyclohexylglycine, etc.). The data in Table V of the patent indicates that the highly substituted compounds, such as N-t-butylglycine, are inferior to the straight chain compounds, such as N-butylglycine.

British Pat. No. 1,063,517 to Allen G. Eickmeyer discloses removal of acid gases, such as $CO_2$ and $H_2S$, from gaseous mixtures by the use of potassium carbonate and other alkali metal carbonates in conjunction with particular amines which will avoid corrosion problems and at the same time accelerate the absorption and subsequent desorption of the $CO_2$ and $H_2S$. Specifically disclosed amines are ethylene polyamine, alkanolamines, or alkanolamine borates as well as mixtures thereof. Examples of such amines are ethylenediamine, diethylenetriamine and diethanolamine.

British Pat. No. 1,218,083 describes a process for removing acid gases from feed streams by contacting the feed streams with a composition comprising an alkaline salt, such as potassium carbonate, and an alkanolamine such as diisopropanolamine.

British Pat. No. 1,238,696 discloses a process for removing acid gases from feed streams by contacting the feed streams with a composition comprising an organic solvent and an alkanolamine, such as cyclohexylaminoethanol. The patent does not disclose the advantages of using sterically hindered amines to improve working capacity.

British Pat. No. 1,305,718 describes a process for removing acid gases from gaseous streams by contacting the same with an absorbing solution comprising a solution of an alkaline salt of an alkali metal and regeneration of the absorbing solution wherein the absorbing solution includes a minor amount of a substituted or unsubstituted aminoacid. Examples of the aminoacids described are N-ethyl-3-amino propionic acid, N-ethyl-4-amino butyric acid, and N-ethyl-6-amino hexanoic acid.

U.S. Pat. No. 2,176,441 to Ulrich et al. teaches the use of aminoacids having a primary, secondary, or tertiary amino group and at least two nitrogen atoms to remove acidic gases. The patentees provide various general formulae for the aminoacids taught to be useful in the acid gas scrubbing process. While certain "sterically hindered amines" can be derived by proper choice of substituent groups in the general formulae there is no teaching that the sterically hindered amines will achieve any unexpected results, such as improved working capacity.

Canadian Pat. No. 619,193 teaches the use of various aqueous solutions containing specific amino compounds for the removal of acidic gases, such as $CO_2$, from gaseous feed streams. Careful choice of the various $R_1$ and $R_2$ groups in the formula in column 4, lines 35–40, will reveal sterically hindered amines. However, there is no teaching that these amines give improved results or working capacity compared to nonsterically hindered amines.

Prior art workers have taught that sterically hindered amines would have low rates of combination with $CO_2$ and apparently concluded, although other explanations are possible, that such sterically hindered amines would be inefficient in $CO_2$ scrubbing processes. For example, Sharma, M. M., *Trans Faraday Soc.*, 61, 681–8 (1965) described the kinetics of reaction between $CO_2$ and COS with 38 amines, some of which are sterically hindered amines. Other researchers have attributed relatively poor absorption rates of $CO_2$ by amines to steric hindrance. See, for example, J. L. Frahn and J. A. Mills, *Aust. J. Chem.*, 17, 256–73, 263 (1964) and M. B. Jensen, *Acta Chemica Scandinavica*, 11, 499–505 (1957).

Shrier and Danckwerts, *Ind. Eng. Chem. Fundamentals*, 8, 415 (1969) discussed the use of amines as promoters for aqueous carbon dioxide absorption solutions. However, these researchers only ran initial absorption experiments and did not recognize the unique capacity advantages obtained by using sterically hindered amines in an acid gas scrubbing process. Also of interest is Danckwerts and Sharma, *The Chemical Engineer*, October 1966, pp 244–280.

In the prior art discussed above, it is apparent that the efficiency of processes employing absorbing solutions is generally limited by the relatively slow rate of transfer of molecules of the acid gas from the gas phase to the liquid phase as well as in the regeneration of the absorbing solution. Many of the above-described prior art processes deal with means to render the acid gas scrubbing process more efficient. In copending U.S. application Ser. No. 590,427, filed June 26, 1975, the disclosure of which is incorporated herein by reference, there is disclosed and claimed processes for scrubbing acid gases, e.g., $CO_2$, comprising the use of sterically hindered amines and the scrubbing solutions, per se. These sterically hindered amines, unexpectedly improve the efficiency, effectiveness and working capacity of the acid gas scrubbing processes in all three of the above-mentioned process categories.

It has been observed, however, that when a sterically hindered amine selected from the group consisting of aminoethers, aminoalcohols, di- and triamines are used as activators, (i.e., the most effective activators in terms of working capacity) in a "hot potash" $CO_2$ containing acid gas scrubbing process, phase separation often occurs under acid gas-lean conditions, particularly during desorption. This problem occurs more frequently when the potassium carbonate is used in 30% concentrations. This observed problem of phase separation could be resolved by carrying out an incomplete desorption of the acid gas, so as to maintain the scrubbing solution in the one-phase region. However, such a proposal would not take full advantage of the absorbent (scrubbing) solution's thermodynamic capacity.

It has now been discovered that the above-described phase separation problem can be solved, and full advantage can be taken of the absorbent solution's thermodynamic capacity by adding at least one aminoacid containing 4 to 8 carbon atoms as a cosolvent for the sterically hindered amine activator. This discovery was unexpected since we have found that aminoacids having less than 4 carbons, such as glycine, do not have this cosolvency effect.

SUMMARY OF THE INVENTION

In one embodiment of the present invention there is provided a process for the removal of acidic components from a gaseous mixture, said acidic components being selected from the group consisting of $CO_2$ alone or in combination with $H_2S$, $SO_2$, $SO_3$, $CS_2$, HCN, COS and the oxygen and sulfur derivatives of $C_1$ to $C_4$ hydrocarbons, which comprises contacting said gaseous mixture with an aqueous solution comprising (1) a basic alkali metal salt or hydroxide selected from the group consisting of alkali metal bicarbonates, carbonates, hydroxides, borates, phosphates and their mixtures and (2) an activator for said basic salt comprising at least one sterically hindered amine containing at least one secondary amino group attached to either a secondary or tertiary carbon atom or a primary amino group attached to a tertiary carbon atom, said sterically hindered amines being members selected from the group consisting of aminoethers, aminoalcohols, di- and triamines, the improvement comprising contacting said gaseous mixture and said solution in the presence of an aminoacid having 4 to 8 carbon atoms which is a cosolvent for said sterically hindered amines to prevent phase separation of said solution at high temperatures and low fractional conversions during said contacting.

In another embodiment of the invention, there is provided an aqueous acid scrubbing solution comprising a mixture of 10 to about 40% by weight of potassium carbonate, 2 to about 20% by weight of at least one sterically hindered amine containing at least one secondary amino group attached to either a secondary or tertiary carbon atom or a primary amino group attached to a tertiary carbon atom and 2 to about 20% by weight of a tertiary or sterically hindered amino-acid having 4 to 8 carbon atoms which is free of any hydroxyl groups.

DESCRIPTION OF THE PREFERRED EMBODIMENTS

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor. The term acid gas includes alone or in combination with $CO_2$, $H_2S$, $SO_2$, $SO_3$, $CS_2$, HCN, COS and the oxides and sulfur derivatives of $C_1$ to $C_4$ hydrocarbons. These acid gases may be present in trace amounts within a gaseous mixture or in major proportions.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C, and more preferably from 35° to about 150° C. Pressures may vary widely; acceptable pressures are between 5 and 2000 psig, preferably 100 to 1500 psig, and most preferably 200 to 1000 psig in the absorber. In the desorber the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption the solution is maintained in a single phase by action of the aminoacid cosolvent on the relatively insoluble sterically hindered amines. Quite unexpectedly, the aminoacid cosolvent also reduces foam formation.

The absorbing solution comprising the aqueous mixture containing the alkaline metal salt, sterically hindered amine and aminoacid which is saturated or partially saturated with gases, such as $CO_2$ and $H_2S$ may be regenerated so that it may be recycled back to the absorber. The regeneration should also take place in a single liquid phase. Therefore, the presence of the aminoacid cosolvent provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorbing step, i.e., 25° to about 200° C, and preferably 35° to about 150° C. The absorbing solution, after being cleansed of at least a portion of the acid bodies, may be recycled back to the absorbing tower. Makeup absorbent may be added as needed. Single phase is maintained during desorption by controlling the acid gas, e.g., $CO_2$, level so that it does not fall into the region where two liquid phases form. This, of course, following the practice of the present invention is facilitated by the use of the aminoacid cosolvent in combination with the sterically hindered amine.

For example, during desorption, the $CO_2$-rich solution from the high pressure absorber is sent first to a flash chamber where steam and some $CO_2$ are flashed from solution at low pressure. The amount of $CO_2$ flashed off will in general be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C, preferably 35° to about 150° C, and more preferably 100° to about 140° C. Stripper and flash temperatures will, of course, depend on stripper pressure, thus at about 16 to 25 psia stripper pressures, the temperature will preferably be about 100° to about 140° C during desorption. Single phase is maintained during desorption by regulating the amount of acid gas, e.g. $CO_2$, recovered.

In the most preferred embodiment of the present invention the acid gas, e.g., $CO_2$, is removed from a gaseous stream by means of a process which comprises, in sequential steps, (1) contacting the gaseous stream with a solution comprising 10 to about 40 weight percent, preferably 20 to about 30 weight percent of $K_2CO_3$, an activator system comprising 2 to about 20 weight percent, preferably 5 to about 15 weight percent of at least one sterically hindered amine containing at least one secondary amino group attached to either a secondary or tertiary carbon atom or a primary amino group attached to a tertiary carbon atom, said sterically hindered amines being members selected from the group consisting of aminoethers, aminoalcohols, di- and triamines, 2 to about 20 weight percent, and preferably 5 to about 15 weight percent of an aminoacid which is a cosolvent for said sterically hindered amine, the balance of said solution being comprised of water, said contacting being conducted at conditions whereby the acid gas is absorbed in said solution, and preferably at a temperature ranging from 25° to about 200° C, more preferably from 35° to about 150° C and a pressure ranging from 100 to about 1500 psig, and (2) regenerating said solution at conditions whereby said acid gas is desorbed from said solution. By practicing the present invention one can operate the process above described at conditions whereby the working capacity, which is the difference in moles of acid gas absorbed in the solution at the termination of steps (1) and (2) based on the moles of $K_2CO_3$ originally present, is greater than obtained under the same operating conditions for removing acid gases from gaseous streams, wherein said same operating conditions do not include a sterically hindered amine promoter. In other words, working capacity is defined as follows:

$$\frac{CO_2 \text{ in Solution At Completion of Absorption}}{} - \frac{CO_2 \text{ in Solution At Completion of Desorption}}{}$$

which is:

$$\left[\frac{\text{Moles of } CO_2 \text{ Absorbed}}{\text{Initial Moles } K_2CO_3}\right] -$$

$$\left[\frac{\text{Moles Residual CO}_2\text{ Absorbed}}{\text{Initial Moles K}_2\text{CO}_3}\right]$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of $K_2CO_3$. The working capacity relates to the thermodynamic cyclic capacity, that is the loading is measured at equilibrium conditions. This working capacity may be obtained from the vapor liquid equilibrium isotherm, that is from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) solution composition, that is weight percent amine and the weight percent of the alkaline salt or hydroxide, for example potassium carbonate, and (6) gas composition. The skilled artisan may conveniently demonstrate the improved process which results by use of a sterically hindered amine by a comparison directly with a process wherein the sterically hindered amine is not included in the aqueous scrubbing solutions. For example, it will be found when comparing two similar acid gas scrubbing processes (that is similar gas composition, similar scrubbing solution composition, similar pressure and temperature conditions) that when the sterically hindered amines are utilized the difference between the amount of acid gas, e.g., $CO_2$ absorbed at the end of step 1 (absorption step) defined above and step 2 (desorption step) defined above is significantly greater. This significantly increased working capacity is observed even though the scrubbing solution that is being compared comprises an equimolar amount of a prior art amine promoter, such as diethanolamine, 1,6-hexanediamine, etc. It has been found that the use of the sterically hindered amines gives a working capacity which is at least 15% greater than the working capacity of a scrubbing solution which does not utilize a sterically hindered amine. Working capacity increases of from 20 to 60% may be obtained by use of the sterically hindered amines.

While not wishing to be bound by theory, it is believed tha the use of sterically hindered amines gives the above-described improvements for the following reasons.

When $CO_2$ is absorbed into an aqueous primary amine solution, the following reactions occur:

$$R - NH_2 + CO_2 \rightarrow R - NH - COO^- + H^+ \quad (1)$$

$$R - NH - COO^- + H_2O \rightarrow R - NH_2 + HCO_3^- \quad (2)$$

$$H^+ + R - NH_2 \rightarrow R - NH_3^+ \quad (3)$$

The amount of $CO_2$ that can be absorbed depends on the extent of reaction (2). If reaction (2) is negligible, the net result of reactions (1) and (3) will be:

$$2R - NH_2 + CO_2 \rightarrow R - NH - COO^- + R - NH_3^+$$

i.e., the maximum amount of $CO_2$ that can be absorbed is 0.5 moles/mole of amine.

On the other hand, if reaction (2) is quantitative, the net result of reactions (1), (2), and (3) will be:

$$R - NH_2 + CO_2 + H_2O \rightarrow HCO_3^- + R - NH_3^+$$

i.e., the maximum amount of $CO_2$ that can be absorbed is 1 mole/mole of amine.

The extent of reaction (2) depends on the nature of R, particularly on its steric configuration. If R is a primary alkyl group, the carbamate will be relatively stable and its decomposition, i.e., reaction (2) will be incomplete. The maximum amount of $CO_2$ that can be absorbed will be only slightly higher than 0.5 moles/mole of amine. On the other hand, if R is a tertiary alkyl group, the carbamate will be very unstable and its decomposition, i.e., reaction (2) will be practically complete. The maximum amount of $CO_2$ that can be absorbed will be close to 1 mole/mole of amine. Thus, when the amine is sterically hindered, $CO_2$ absorption is more complete than when it is unhindered.

When desorption is carried out, reactions (1), (2) and (3) go from right to left. If R is a primary alkyl group, the decomposition of the carbamate will be incomplete, i.e., desorption will be only partial. On the other hand, if R is a tertiary alkyl group, there will be no way for $CO_2$ to be in a stable form and desorption will be practically complete. Therefore, the amount of $CO_2$ absorbed or desorbed per mole of amine is higher when the amine is sterically hindered.

If the amino group is secondary, a secondary alkyl group attached to it is enough to provide steric hindrance, e.g., N-cyclohexyl-1,3-propanediamine.

Besides increasing working capacity and rates of absorption and desorption, the use of sterically hindered amino groups leads to lower steam consumption during desorption due to the lower amount and easier decomposition of the carbamate.

Steam requirements are the major part of the energy cost of operating an acid gas, e.g., $CO_2$ scrubbing unit. Substantial reduction in energy, i.e., operating costs will be obtained by the use of the process of the sterically hindered amines. Additional savings from new plant investment reduction and debottlenecking of existing plants may also be obtained by the use of sterically hindered amines. The removal of acid gases such as $CO_2$ from gas mixtures is of major industrial importance, particularly the systems which utilize potassium carbonate activated by the sterically hindered amines.

While the sterically hindered amines provide unique benefits in their ability to improve the working capacity in an acid scrubbing process, their efficiency decreases in alkaline scrubbing systems at high temperatures and at low concentrations of the acid gas due to phase separation. Therefore, full advantage of the highly effective sterically hindered amines, such as the aminoethers, aminoalcohols, di- and triamines cannot be utilized at these operating conditions. Quite unexpectedly, the addition of an aminoacid as a cosolvent solves the problem of phase separation and enables a more complete utilization of the sterically hindered amine as the activator. This result is unexpected for the reason that the aminoacids alone, while soluble in these alkaline systems, are not as effective as activators in acid scrubbing processes as instantly claimed.

The absorbing solution of the present invention will be comprised of a major proportion of alkali metal salts and a minor proportion of the amine activator comprising the sterically hindered amines and aminoacid cosolvent. The salt content of the solution will be in the range from about 10 to 40 weight percent, preferably 20 to 30 weight percent. The content of the sterically hindered amine in the solution will be in the range from about 2 to about 20 weight percent, preferably 5 to about 15 percent and more preferably 5 to about 10 weight percent. The content of the aminoacid cosolvent will be in the range from about 2 to about 20 weight percent, preferably 5 to about 15 weight percent. The remainder of the solution will be comprised of water and/or other commonly used additives, such as antifoaming agents (it should be noted that the aminoacids themselves unexpectedly act as antifoaming agents in the aqueous scrubbing solution of the present invention), antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

It has been known in the past to use alkali metal carbonates, bicarbonates, hydroxides, borates and phosphates for the absorption of the acid gases from a fluid or gaseous mixture. These salts may be used in the present invention. Typical salts which may be utilized in the practice of the present invention include sodium hydroxide, sodium carbonate, lithium carbonate, potassium hydroxide, potassium bicarbonate, potassium carbonate and cesium carbonate, potassium carbonate being most preferred.

The sterically hindered amines useful in the practice of the present invention include the aminoethers, aminoalcohols (including but not limited to diaminoalcohols), di- and triamines wherein the amino compounds contain at least one secondary amino group attached to either a secondary or tertiary carbon atom or a primary amino group attached to a tertiary carbon atoms. Preferably, the sterically hindered amines will be asymmetrical compounds inasmuch as the symmetrical amines have a tendency to give solid precipitates in the aqueous alkaline compositions utilized in the practice of the present invention. The most preferred sterically hindered amines to be used as amine activators for the alkaline absorbents in the practice of the present invention include N-cyclohexyl-1, 3-propane-diamine, $N_1$(1,1-dimethyl-2-hydroxyethyl)-2-methyl-1,2-propanediamine, 2-methylpiperazine and 2,5-dimethylpiperazine.

Nonlimiting examples of the sterically hindered amine activators include:

| AMINOETHERS | |
|---|---|
| sterically hindered amino-hydroxyalkyl ethers: | |
| 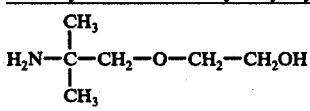 | 2(2-amino-2-methylpropoxy)-ethanol |

| AMINOALCOHOLS | |
|---|---|
| sterically hindered primary monoaminoalcohols: | |
| 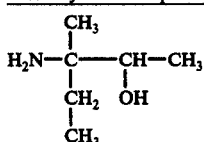 | 3-amino-3-methyl-2-pentanol |
| 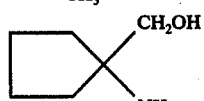 | 1-hydroxymethyl-cyclopentylamine |
| 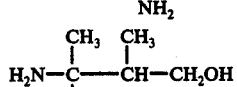 | 2,3-dimethyl-3-amino-1-butanol |
| 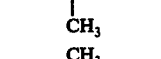 | 2-amino-2-ethyl-1-butanol |
| 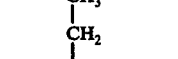 | |
| 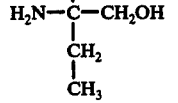 | 1-methyl-2-hydroxycyclopentylamine |
| 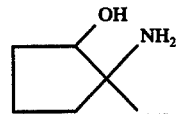 | 2-amino-2-methyl-3-pentanol |

-continued

| Structure | Name |
|---|---|
| cyclohexane with CH₃, CH₃, NH₂, OH substituents | 2,4-dimethyl-2-amino cyclohexanol |
| cyclohexane with NH₂ and CH₂—CH₂—OH | 1-hydroxyethyl cyclohexylamine |
| cyclohexane with CH₂OH, NH₂, and CH₃ | 1-hydroxymethyl-3-methyl cyclohexylamine |
| cyclohexane with CH₂OH, NH₂, CH₃ | 2-hydroxymethyl-1-methyl cyclohexylamine |
| H₂N—C(CH₃)(CH₃)—CH₂OH | 2-amino-2-methyl-1-propanol |
| H₂N—C(CH₃)(CH₂CH₃)—CH₂OH | 2-amino-2-methyl-1-butanol |
| H₂N—C(CH₃)(CH₃)—CH₂—CH₂OH | 3-amino-3-methyl-1-butanol |
| H₂N—C(CH₃)(CH₃)—CH(OH)—CH₃ | 3-amino-3-methyl-2-butanol |
| H₂N—C(CH₃)(CH₃)—C(CH₃)(CH₃)—OH | 2-amino-2,3-dimethyl-3-butanol |
| H₂N—C(CH₃)(CH(CH₃)₂)—CH₂OH | 2-amino-2,3-dimethyl-1-butanol |
| cyclohexane with CH₂OH and NH₂ | 1-hydroxymethyl-cyclohexylamine |

2-substituted piperidine alcohols

| Structure | Name |
|---|---|
| piperidine with CH₂OH at 2-position | 2-piperidine methanol |
| piperidine with CH₂—CH₂OH at 2-position | 2-piperidine ethanol |

-continued

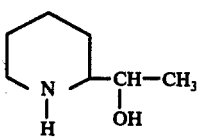 2-(1-hydroxyethyl)-piperidine

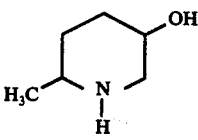 5-hydroxy-2-methyl piperidine

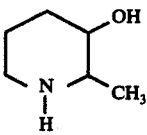 2-methyl-3-hydroxy piperidine

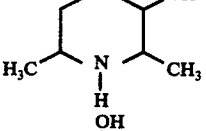 2,6-dimethyl-3-hydroxy piperidine

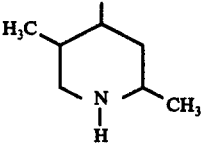 2,5-dimethyl-4-hydroxy piperidine aliphatic diaminoalcohols:

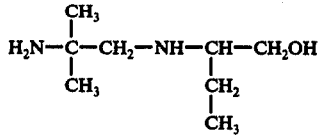 $N_1$ (1-hydroxy-2-butyl)-2-methyl-1,2-propanediamine

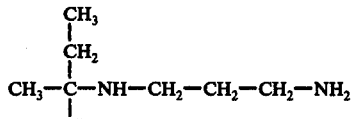 N(1-hydroxy-2-methyl-2-butyl)-1,3-propanediamine

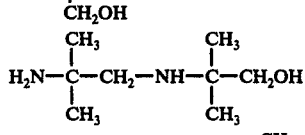 $N_1$ (1,1-dimethyl-2-hydroxyethyl)-2-methyl-1,2-propanediamine

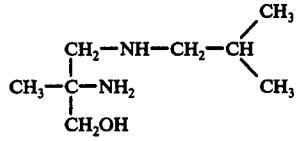 $N_3$-isobutyl-2-methyl-2,3-diamino-1-propanol

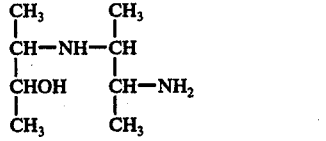 N (3-hydroxy-2-butyl)-2,3-diaminobutane

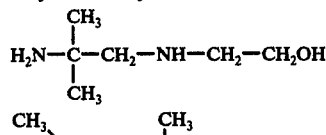 $N_1$-hydroxyethyl-2-methyl-1,2-propanediamine

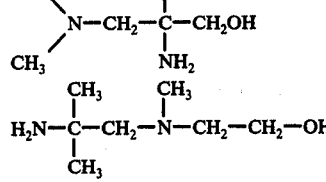 2,$N_3$,$N_3$-trimethyl-2,3-diamino-1-propanol

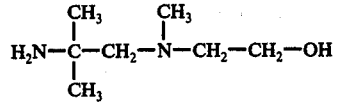 $N_1$,2-dimethyl-$N_1$-hydroxyethyl-1,2-propanediamine

-continued

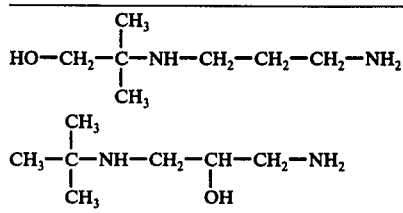 N (1,1-dimethyl-2-hydroxyethyl)-1,3-propanediamine

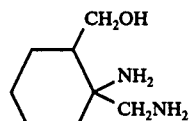 N-tert. butyl-1,3-diamino-2-propanol cycloaliphatic diaminoalcohols:

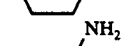 1-amino-1-aminomethyl-2-hydroxymethyl-cyclohexane

N-hydroxyethyl-1,2-diaminocyclohexane

N-cyclohexyl-1,3-diamino-2-propanol

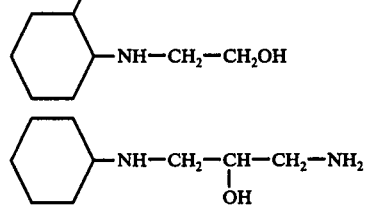 N-(2-hydroxycyclohexyl)-1,3-propanediamine

N-isopropanol-1,2-diaminocyclohexane

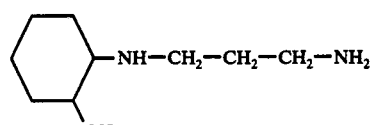 N-(2-hydroxybutyl)-1,4-diaminocyclohexane

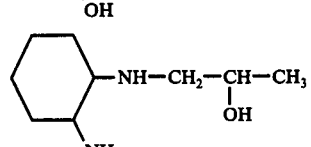

DIAMINES monoprimary aliphatic diamines:

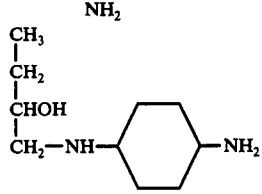 N₁-tert. butyl-1,4-pentanediamine 2-ethylamino-2-methyl-4-aminopentane

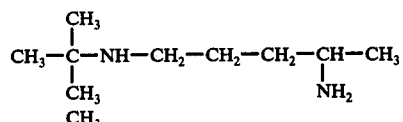

N-tert. pentyl-1,4-butanediamine

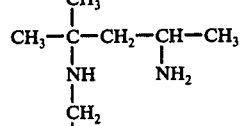

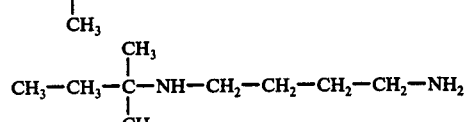 N-tert. butyl-1,5-pentanediamine

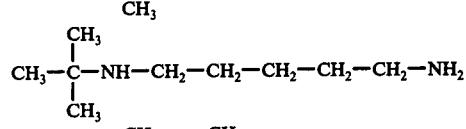

N₂-isopropyl-2-methyl-1,2-propanediamine

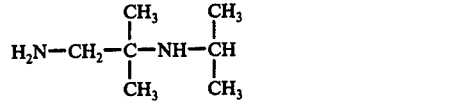

-continued

| Structure | Name |
|---|---|
| CH₃–CH(CH₂CH₃)–NH–CH₂–CH₂–CH₂–NH₂ | N-sec. butyl-1,3-propanediamine |
| CH₃–CH₂–C(CH₃)(NH₂)–CH₂–N(CH₃)₂ with extra CH₃ on N | N₁-dimethyl-1,2-diamino-2-methylbutane |
| (CH₃)₃C–NH–CH₂–CH₂–NH₂ | N-t-butyl-ethylenediamine |
| (CH₃)₃C–NH–CH₂–CH₂–CH₂–NH₂ | N-t-butyl-1,3-propanediamine |
| CH₃–C(CH₃)(NHCH₃)–CH₂–CH(NH₂)–CH₃ | 2-methylamino-2-methyl-4-amino pentane |
| H₂N–C(CH₃)₂–CH₂–NH–CH₂–CH₂–CH₂–CH₃ | N₁-butyl-2-methyl-1,2-propanediamine |
| CH₃–CH(CH₂CH₃)–NH–CH₂–CH(CH₃)–CH₂–NH₂ | N-sec. butyl-2-methyl-1,3-propanediamine |
| H₂N–C(CH₃)₂–CH₂–NH–CH₂–CH₂–CH₃ | N₁-propyl-2-methyl-1,2-propanediamine |
| (CH₃)₃C–NH–CH₂–CH₂–CH₂–CH₂–NH₂ | N-t-butyl-1,4-butanediamine |
| H₂N–CH₂–CH(NHCH₂CH₃)–CH₂–CH₂–CH₂–CH₃ | N₂-ethyl-1,2-hexanediamine | arylaliphatic diamines:

| Structure | Name |
|---|---|
| C₆H₅–C(CH₃)(NH₂)–CH₂–NH₂ | 1-methyl-1-phenyl ethylenediamine |
| C₆H₅–CH₂–C(CH₃)(NH₂)–CH₂–NH₂ | 2-benzyl-1,2-propanediamine |
| C₆H₅–CH(C₂H₅)–NH–CH₂–CH₂–NH₂ | 1-phenyl-1(2-amino-ethylamino)-propane |
| C₆H₅–C(NH₂)(CH₂CH₃)–CH₂–NH–CH₃ | N₁-methyl-2-phenyl-1,2-butanediamine |

-continued cycloaliphatic diamines:

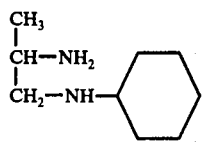 N₁-cyclohexyl-1,2-propanediamine

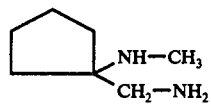 1-methylamino-1-aminomethyl-cyclopentane

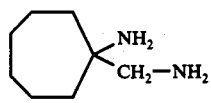 1-amino-1-aminomethylcycloheptane

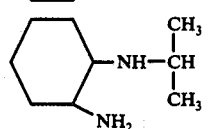 N-isopropyl-1,2-diaminocyclohexane

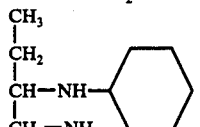 N₂-cyclohexyl-1,2-butanediamine

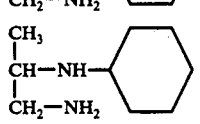 N₂-cyclohexyl-1,2-propanediamine

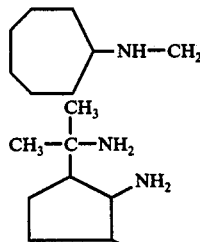 N-cycloheptyl-ethylenediamine

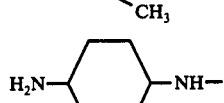 1-(2-aminoisopropyl)-2-amino-3-methylcyclopentane

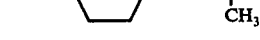 N-isopropyl-1,4-diaminocyclohexane

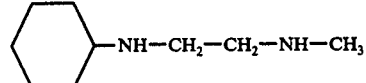 N₁-cyclohexyl-N₂-methyl-ethylenediamine

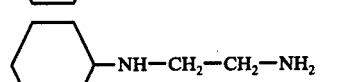 N-cyclohexyl-ethylenediamine

 N₁-cyclohexyl-N₂-ethyl-ethylenediamine

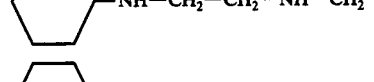 N-cyclohexyl-1,3-propanediamine

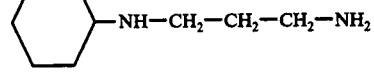 1-amino-1-aminomethylcyclohexane

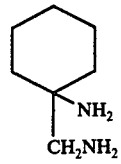

-continued

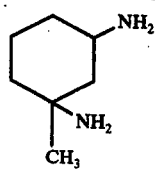  1,3-diamino-1-methylcyclohexane

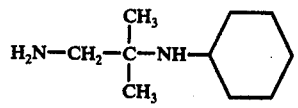  $N_2$-cyclohexyl-2-methyl-1,2-propanediamine biprimary aliphatic diamines:

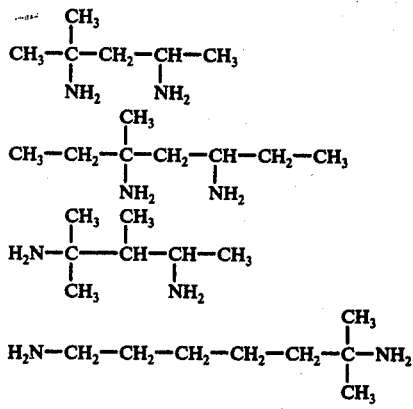

2,4-diamino-2-methylpentane 3,5-diamino-3-methylheptane 2,3-dimethyl-2,4-pentane diamine $H_2N-CH_2-CH_2-CH_2-CH_2-CH_2-\underset{\underset{CH_3}{|}}{\overset{\overset{CH_3}{|}}{C}}-NH_2$   2-methyl-2,7-heptane diamine disecondary aliphatic diamines:

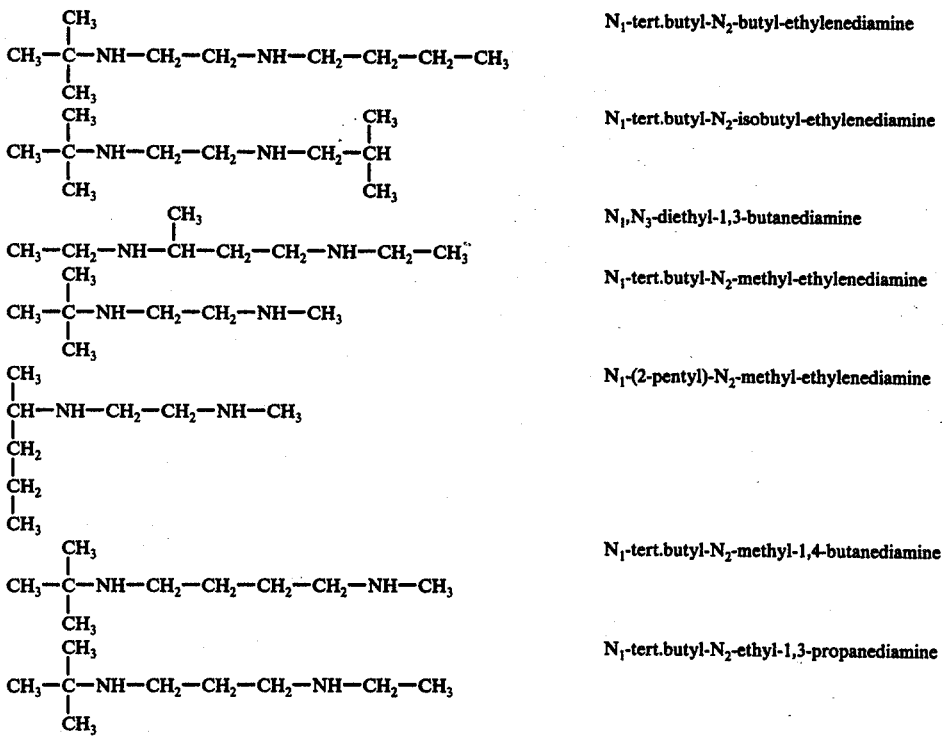

$N_1$-tert.butyl-$N_2$-butyl-ethylenediamine $N_1$-tert.butyl-$N_2$-isobutyl-ethylenediamine $N_1,N_3$-diethyl-1,3-butanediamine $N_1$-tert.butyl-$N_2$-methyl-ethylenediamine $N_1$-(2-pentyl)-$N_2$-methyl-ethylenediamine $N_1$-tert.butyl-$N_2$-methyl-1,4-butanediamine $N_1$-tert.butyl-$N_2$-ethyl-1,3-propanediamine secondary-tertiary diamines:

   $N_1$-tert-butyl-$N_2$-diethyl ethylene diamine

TRIAMINES aliphatic triamines:

-continued

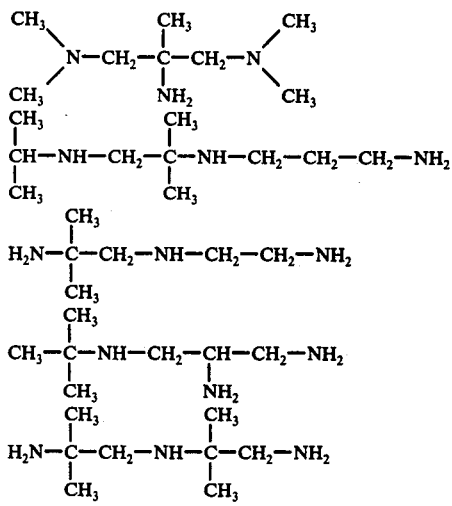

N₁,N₃,2-pentamethyl-1,2,3-triaminopropane

N₁-isopropyl-N₂-(3-aminopropyl)-2-methyl-1,2-propanediamine 2,2-dimethyl-diethylenetriamine N₁-tert.butyl-1,2,3-triaminopropane 2,2,5,5-tetramethyldiethylenetriamine cycloaliphatic triamines:

N₁-cyclohexyl-dipropylene triamine

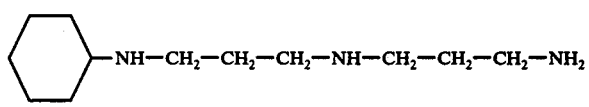

HETEROCYCLIC DI- AND TRIAMINES azacyclo alkanes:

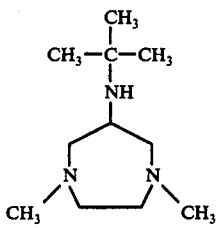

1-tert.butylamino-3,6-diaza-cycloheptane piperazine derivatives:

2-methyl piperazine 2,5-dimethyl piperazine 2-tert.butylamino-methyl-1,4-dimethyl-piperazine

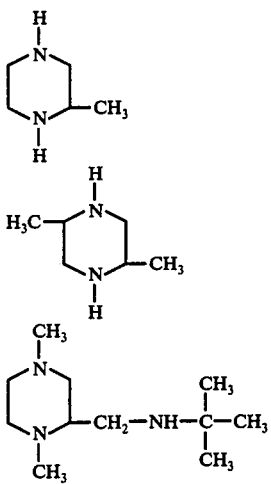

THE AMINOACID COSOLVENT

The aminoacid cosolvents for the sterically hindered amines useful in the practice of the present invention include those aminoacids having 4 to 8 carbon atoms which increase the solubility of sterically hindered amines in alkaline aqueous conditions at elevated temperatures. Preferably, the aminoacids will be a sterically hindered aminoacid containing at least one secondary amino group attached to either a secondary or tertiary carbon atom, a primary amino group attached to a tertiary carbon atom or a tertiary amino group which are free of any hydroxyl groups. When hydroxyl groups are present on the aminoacids, the solubility is too great and the cosolvency power is decreased. Thus, these aminoacids are undesirable.

The aminoacids may include the aliphatic mono- and diaminoacids, the cycloaliphatic and heterocyclic aminoacids. The preferred aminoacids include pipecolinic acid, N,N-dimethyl glycine, 3-amino-3-methyl butyric acid and 2-amino-2-methyl-butyric acid.

Non-limiting examples of aminoacids that can be used in accordance with the practice of the present invention include:

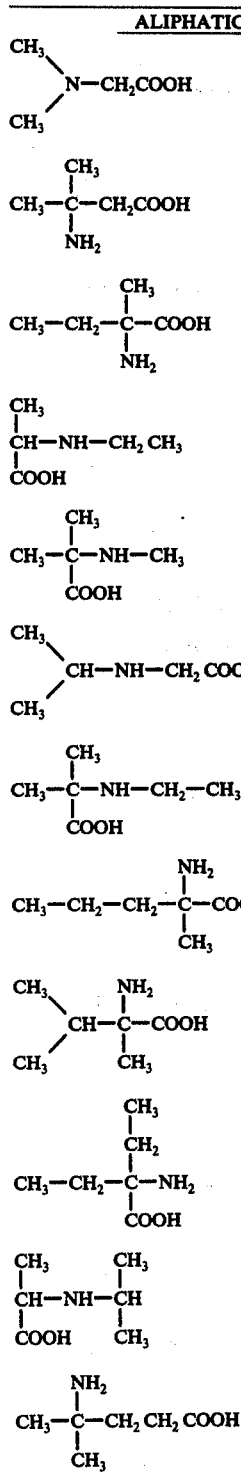
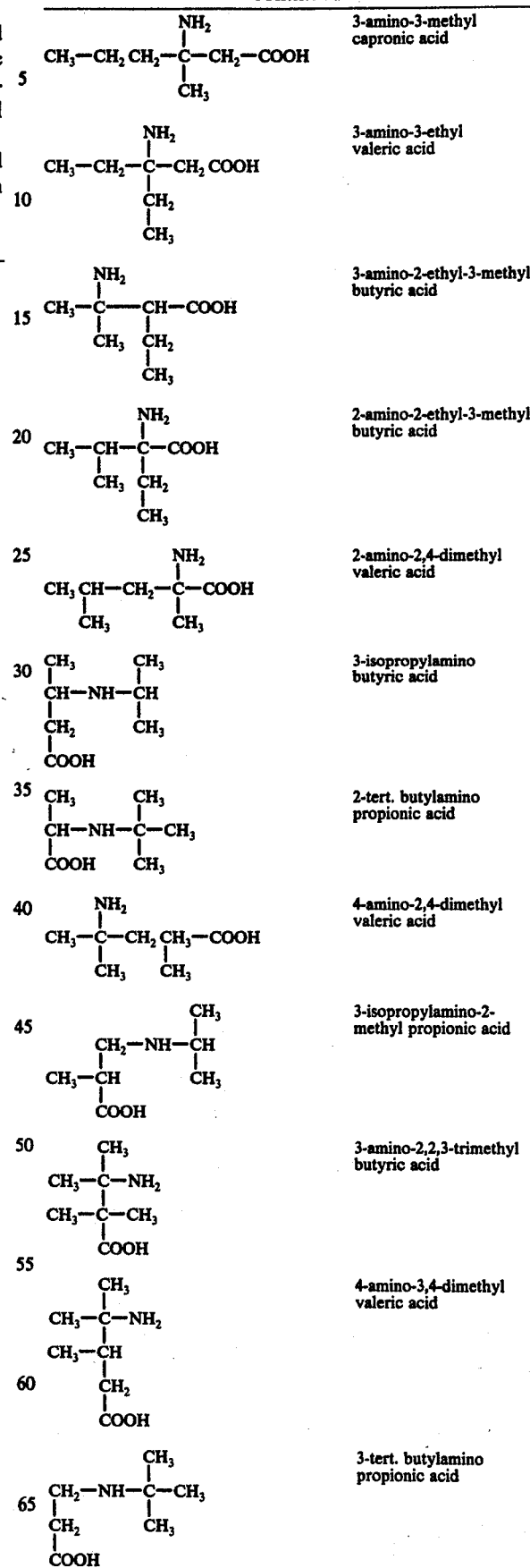

-continued

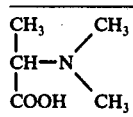 N,N-dimethyl alanine

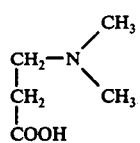 N,N-dimethylbeta alanine

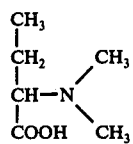 2-dimethylamino butyric acid

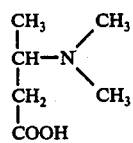 3-dimethylamino butyric acid

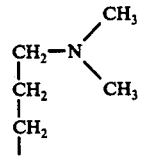 4-dimethylamino butyric acid

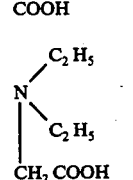 N,N-diethyl glycine

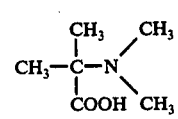 N,N,2-trimethyl alanine

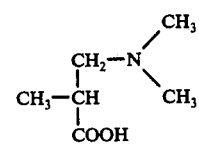 N,N,2-trimethylbeta alanine

ALIPHATIC DIAMINOACIDS

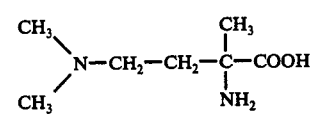 2-amino-2-methyl-4-dimethylamino butyric acid

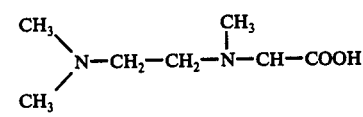 N-methyl-N-(2-dimethyl-amino-ethyl)-glycine

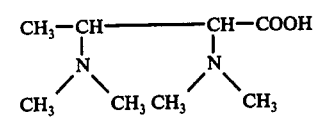 2,3-bis-dimethylamino butyric acid

CYCLOALIPHATIC AMINOACIDS

-continued

 1-amino-cyclopentane carboxylic acid

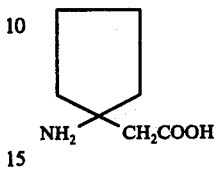 1-amino-cyclopentane acetic acid

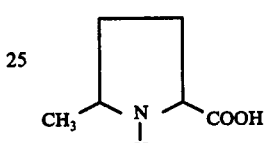 1-amino-cyclohexane carboxylic acid

HETEROCYCLIC AMINOACIDS

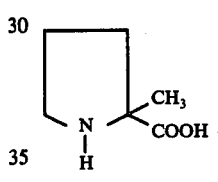 5-methyl-2-pyrrolidine carboxylic acid

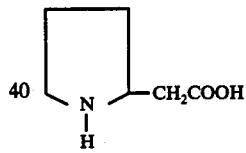 2-methyl-2-pyrrolidine carboxylic acid

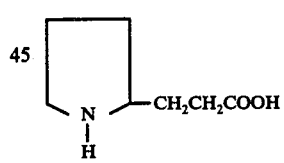 2-pyrrolidine acetic acid

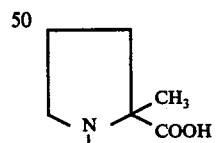 2-pyrrolidine propionic acid

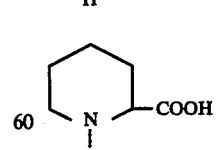 2-methyl-2-pyrrolidine carboxylic acid

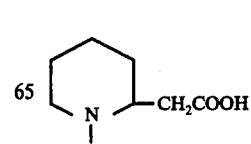 pipecolinic acid 2-piperidine acetic acid

-continued

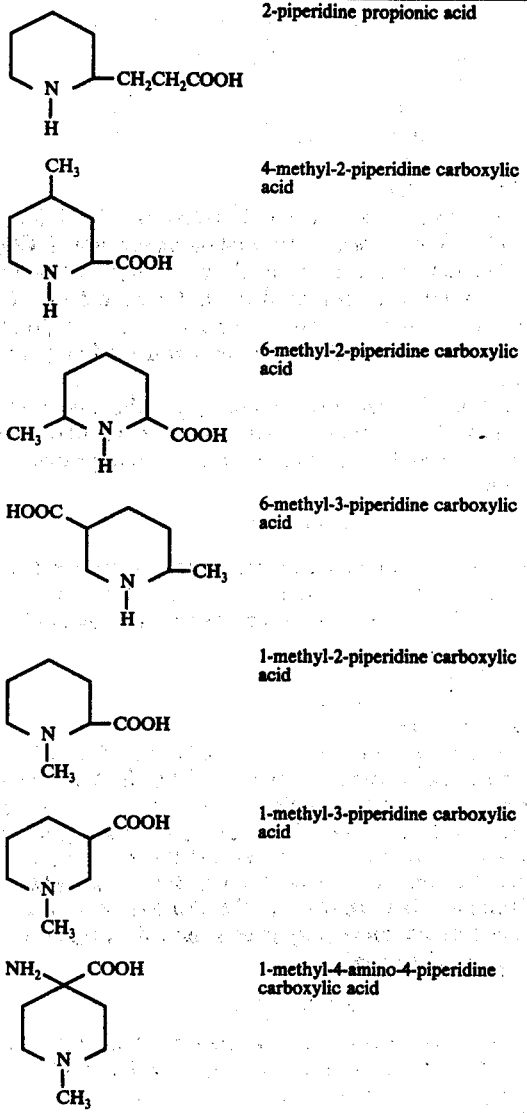

2-piperidine propionic acid 4-methyl-2-piperidine carboxylic acid 6-methyl-2-piperidine carboxylic acid 6-methyl-3-piperidine carboxylic acid 1-methyl-2-piperidine carboxylic acid 1-methyl-3-piperidine carboxylic acid 1-methyl-4-amino-4-piperidine carboxylic acid The aminoacid cosolvent may be used with the sterically hindered amine in any convenient manner. In one preferred embodiment of the invention the sterically hindered amine and the aminoacid are premixed and placed in the form of an activator concentrate. This activator concentrate which may optionally include the inorganic acid absorber, e.g. $K_2CO_3$, can be diluted or used as in the acid gas scrubbing process of the present invention.

The invention is illustrated further by the following examples which, however, are not to be taken as limiting in any respect. All parts and percentages, unless expressly stated to be otherwise, are by weight.

EXAMPLE 1

This example demonstrates that a $CO_2$ acid gas absorption-desorption cycle can be carried out using potassium carbonate activated with the sterically hindered amines as defined herein and the aminoacid cosolvent. The reaction apparatus consists of an absorber and a desorber. The absorber is the same type of absorber shown in FIG. 1 of copending application U.S. Ser. No. 590,427, the disclosure of which is incorporated herein by reference. It is a vessel having a capacity of about 2.5 liters and a diameter of 10 cm, equipped with stirrer, reflux condenser and inlet tube for gases. The desorber is a similar 1-liter reactor, equipped with stirrer, gas sparger, reflux condenser and thermometer.

An acid gas absorbent solution is prepared having the following composition:
   55 g. N-cyclohexyl-1,3-propanediamine
   36 g. N,N-dimethylglycine
   225 g. $K_2CO_3$
   434 g. $H_2O$ The acid gas absorbent solution is charged into the absorber and heated to 80° C. The apparatus is evacuated until the liquid begins to boil, then pure $CO_2$ is introduced into the absorber. Upon completion of the $CO_2$ addition, 34 liters of $CO_2$ is absorbed. Analysis of the absorbent solution gives a total $CO_2$ content of 14.8% by weight. The absorbent solution is perfectly clear and does not show any tendency to precipitate or exhibit phase separation.

The $CO_2$ rich absorbent solution containing the absorbed $CO_2$ acid gas is thereafter transferred to the desorber and boiled for 1 hour, while stirring and slowly purging with nitrogen gas to strip the $CO_2$ from the absorbent solution. At the end of the desorption process, the total $CO_2$ content has dropped to 8.8%, by weight, at which point no phase separation of the absorbent solution is observed.

EXAMPLE 2

This example demonstrates absorption of $CO_2$ with the potassium carbonate solution activated by the sterically hindered amine and the aminoacid cosolvent of the present invention in an autoclave to simulate a larger scale operation in an acid gas scrubbing process.

The following acid gas absorbent scrubbing solution was charged into an autoclave equipped with a window.
   18.5 g. N-cyclohexyl-1,3-propanediamine
   7.6 g. pipecolinic acid
   75.0 g. $K_2CO_3$
   149.0 g. $H_2O$ The autoclave is closed and heated to 121° C. (250° F.), while slowly purging with pure $CO_2$ gas at a total pressure of 150 psia., until the outgoing gas has the same condition as the entering gas, as shown by gas chromatography. At this time equilibrium is reached, at which point the absorbent solution of the present invention is saturated with $CO_2$. The solution is perfectly clear and it does not exhibit any precipitation or phase separation even after lowering the temperature to 107° C. (225° F.).

The following examples illustrate the advantages of using the aminoacid defined above as cosolvents for the sterically hindered amines under lean $CO_2$ conditions (as often occurs at the end of the desorption part of an acid scrubbing process) where it has been observed that phase separation frequently occurs when using the highly effective sterically hindered amines as defined herein, i.e., the aminoethers, aminoalcohols, di- and triamines.

EXAMPLE 3

In this example, a 400 ml autoclave is used which is equipped with a side window, magnetic stirrer, reflux condenser, inlet and outlet tubes for gases and sampling device. The following reagents are charged into the autoclave:

16.5 g. N-cyclohexyl-1,3-propanediamine
56.0 g. $K_2CO_3$
138.8 g. Water
13.7 g. Pipecolinic acid The autoclave is closed and heated to 121° C. (250° F.), while a gaseous mixture containing 0.2 mol % $CO_2$ and 99.8 mol % He is slowly blown through the liquid at a pressure of 50 psi, until the outgoing gas has the same composition as the entering gas. At this point, equilibrium is reached. The liquid consists of only one phase.

EXAMPLE 4

Example 3 is repeated, using one-half of the amount of pipecolinic acid, i.e., 6.8 g. and increasing the amount of water to 145.6 g., so as to keep the total weight constant. Otherwise, the same conditions as in Example 3 are used. At equilibrium, the liquid consists of only one phase.

EXAMPLE 5

As a comparison, Examples 3 and 4 are repeated without using the pipecolinic acid cosolvent. The water content is increased to 152 g. so as to keep the total weight constant. Otherwise, the same conditions as in Examples 2 and 3 are used. At equilibrium, two liquid phases are present, thus pointing up the advantage of using the aminoacid cosolvents of the present invention.

EXAMPLE 6

Several experiments are conducted in the same autoclave described in Example 3 to determine the effect of other aminoacid cosolvents in accordance with the practice of the present invention. In the comparative experiment, the autoclave is charged as follows:

16.5 g. N-cyclohexyl-1,3-propanediamine
67.5 g. $K_2CO_3$
141.0 g. Water

In the aminoacid cosolvent experiments, the aminoacid is added, reducing the amount of water so as to keep the total weight equal to 225 g. The experiments are carried out by closing and heating the charged autoclave to 121° C. (250° F.), while slowly blowing a gaseous mixture containing 0.2 mol % $CO_2$ and 99.8 mol % He through the liquid at a pressure of 50 psi, until the outgoing has the same composition as the entering gas. At this point, equilibrium is reached. Table I gives the nature and amount of the aminoacids and the results of these experiments.

Table I

| Effect of Various Aminoacids as Cosolvents[1] | | | |
|---|---|---|---|
| Experiment No. | Aminoacid - Name | g. | Phases |
| 1 | None | 0 | 2 |
| 2 | Pipecolinic acid | 13.7 | 1 |
| 3 | Pipecolinic acid | 6.8 | 1 |
| 4 | N,N-dimethyl glycine | 10.8 | 1 |
| 5 | 3-amino-3-methyl butyric acid | 12.4 | 1 |
| 6 | 2-amino-2-methyl butyric acid | 12.4 | 1 |

[1]Absorbent solution = $K_2CO_3$, 67.5 g; N-cyclohexyl-1,3-propanediamine, 16.5 g.; water to 225 g. and aminoacid where indicated.

EXAMPLE 7

To the same autoclave as described in Example 3, the following acid gas scrubbing solution is charged as follows:

36.6 g. N-cyclohexyl-1,3-propanediamine
15.2 g. pipecolinic acid
62.1 g. $K_2CO_3$
135.7 g. water The autoclave is closed and heated to 121° C. (250° F.), while a gaseous mixture containing 0.2 mol % $CO_2$ and 99.8 mol % He is slowly blown through the liquid at a pressure of 50 psi, until the outgoing gas has the same composition as the entering gas. At this point, equilibrium is reached. The liquid consists of only one phase.

Example 7 is repeated without pipecolinic acid and increasing the amount of water so as to maintain the same total weight. At equilibrium two liquid phases are present.

EXAMPLE 8

To the same autoclave as described in Example 3, an acid gas scrubbing solution is charged as follows:

19 g N,(1,1-dimethyl-2-hydroxyethyl)-2-methyl-1,2-propanediamine
62.5 g $K_2CO_3$
15.2 g. pipecolinic acid
153.3 g. water The autoclave is closed and heated to 121° C (250° F), while a gaseous mixture containing 0.2 mole % $CO_2$ and 99.8 mol % He is slowly blown through the liquid at a pressure of 50 psi, until the outgoing gas has the same composition as the entering gas. At this point equilibrium is reached. The liquid consists of only one phase.

Example 8 is repeated, but the pipecolinic acid was replaced by an equal weight of water. At equilibrium two liquid phases exist.

EXAMPLE 9

To the same autocloave as described in Example 3, an acid gas scrubbing solution is charged as follows:

23.8 g 2-methyl piperazine
75 g $K_2CO_3$
30.4 g pipecolinic acid
121 g water

The autoclave is closed and heated to 121° C (250° F), while a gaseous mixture containing 0.2 mol % $CO_2$ and 99.8 mol % He is slowly blown through the liquid at a pressure of 50 psi, until the outgoing gas has the same composition as the entering gas. At this point equilibrium is reached. The liquid consists of only one phase.

Example 9 is repeated by replacing the pipecolinic acid with an equal weight of water so as to have the same total weight. At equilibrium two liquid phases are present.

EXAMPLE 10

The following reagents are charged into the autoclave described in Example 3.

12.1 g 2,5-dimethylpiperizine
56 g $K_2CO_3$
13.7 g pipercolinic acid
143.2 g water The autoclave is closed and heated to 121° C (250° F), while a gaseous mixture containing 1 mol % $CO_2$ and 99 mol % He is slowly blown through the liquid at a pressure of 100 psi, until the outgoing gas has the same composition as the entering gas. At this point equilibrium is reached. The liquid consists of only one phase.

The above example is repeated without the addition of the aminoacid cosolvent, pipecolinic acid, increasing the amount of water to 156.9 g, so as to have the same total weight as described in the above example. At equilibrium two liquid phases are present.

EXAMPLE 11

The effect of various cosolvents is determined for the sterically hindered amine, N-cyclohexyl-1,3-propanediamine (CHPD) activated potassium carbonate absorbent (scrubbing) solution. The absorbent (scrubbing) solution consists of 150 g of $K_2CO_3$ (30 weight percent) 37 g CHPD (0.235 mols), 0.235 mols cosolvent, and water to 500 g. The experiments are carried out in an autoclave (121° C and 50 psi), blowing through the alkaline solution a mixture of 0.2 mol % $CO_2$ and 99.8% He until the outgoing gas has the same composition as the entering gas. At that point equilibrium is reached. In each of the experiments a sample is taken to see whether one or two phases is present. The results of the experiments are shown in Table II.

TABLE II
EFFECT OF COSOLVENTS ON PHASE SEPARATION IN CHPD-CARBONATE-$CO_2$ SYSTEM

| Cosolvent | | Number of Phases |
|---|---|---|
| $CH_3$\ N—$CH_2$—COOH, /$CH_3$ | dimethyl glycine | 1 |
| $HOCH_2CH_2$\ N—$CH_2$—COOH, /$HOCH_2CH_2$ | bicine (N,N-bis-hydroxyethyl glycine) | 1 |
| [piperidine ring]—COOH, N—H | pipecolinic acid | 1 |
| $H_2N$—$CH_2$—COOH, | glycine | 2 |
| $CH_2CH_2OH$ / $CH_3$—N \ $CH_2CH_2OH$ | N-methyldiethanol amine | 2 |
| $CH_2$—$CH_2$—OH / N—$CH_2$—$CH_2$—OH, \ $CH_2$—$CH_2$—OH | triethanolamine | 2 |

As it can be seen from Table II, only the sterically hindered or tertiary aminoacids are effective in maintaining a one phase system for the CHPD activator, despite the relatively good water solubility possessed by the other cosolvents.

EXAMPLE 12

This example demonstrates that the aminoacids which contain hydroxy groups (e.g., bicine, as used in the previous example as producing a single phase) produce a two phase under high temperatures and pressures, contrary to the results shown in Table II for the hydroxy containing aminoacid, bicine. In this example, a more reliable procedure is employed to examine the phase behavior during the desorption process under lean $CO_2$ conditions, i.e., the autoclave equipped with a window as used in Examples 2–10.

Specifically, the reaction apparatus used is a 400 ml autoclave equipped with window as described in Example 3. The following acid gas absorbent solution was prepared and charged into the autoclave:
18.5 g N-cyclohexyl-1,3-propanediamine
19.3 g bicine (N,N-bis-hydroxyethyl glycine)
75 g $K_2CO_3$
137.2 g $H_2O$ The autoclave is closed and heated to 121° C (250° F), while a gaseous mixture containing 0.2 mol % of $CO_2$ and 99.8 mol % of He is slowly blown through the liquid at a pressure of 50 psig until the outgoing gas has the same composition as the entering gas. At this point equilibrium is reached. The liquid, at equilibrium consists of two phases. Thus, by this more reliable test than used in Example 11, which more closely simulates larger scale acid scrubbing conditions, it is shown that the hydroxy containing aminoacids such as bicine do not adequately act as cosolvents for the sterically hindered amines in maintaining one phase under lean $CO_2$ conditions at the high temperature and pressure conditions employed.

Conducting absorption and desorption in a single phase offers advantageously over operating in two phases, namely, the engineering aspects of handling a single phase solution are simpler than operating with a two phase system.

By the coaction of the sterically hindered amines and aminoacids activators of the present invention, a single phase can be maintained at the desired elevated temperatures and with lean solutions during the desorption cycle of the process as demonstrated in the above examples. Thus, by practicing the present invention improved working capacity can be accomplished by use of the sterically hindered amine activators and a one phase system can be maintained by the unique coaction of the aminoacids and the sterically hindered amines.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises contacting said gaseous stream (1) in an absorption step with an aqueous absorbing solution comprising (a) a basic alkali metal salt or hydroxide selected from the group consisting of alkali metal bicarbonates, carbonates, hydroxides, borates, phosphates and their mixtures, and (b) an activator for said basic alkali metal salt or hydroxide comprising (i) at least one sterically hindered amine containing at least one secondary amino group attached to either a secondary or tertiary carbon atom or a primary amino group attached to a tertiary carbon atom, said sterically hindered amine being a member selected from the group consisting of aminoethers, aminoalcohols, di- and triamines, and (ii) an aminoacid having 4 to 8 carbon atoms which has the capability to increase the solubility of said sterically hindered amines in alkaline aqueous conditions at elevated temperatures; and (2) in a desorption and regeneration step desorbing at least a portion of the absorbed $CO_2$ from said absorbing solution.

2. The process of claim 1 wherein the basic alkali metal salt or hydroxide is $K_2CO_3$.

3. The process of claim 1 wherein said acidic component includes $CO_2$ and $H_2S$.

4. The process of claim 1 wherein said sterically hindered amine is a piperazine derivative or a cycloaliphatic diamine.

5. The process of claim 1 wherein said aminoacid is a sterically hindered aminoacid containing at least one secondary amino group attached to either a secondary or tertiary carbon atom or a primary amino group attached to a tertiary carbon atom and being free of any hdyroxy groups.

6. The process of claim 1 wherein said aminoacid is a tertiary aminoacid which does not contain any hydroxyl groups.

7. The process of claim 1 wherein said basic alkali metal salt or hydroxide is $K_2CO_3$, and said activator is N-cyclohexyl-1,3-propanediamine and said aminoacid is pipecolinic acid.

8. The process of claim 1 wherein said aminoacid is a member selected from the group consisting of pipecolinic acid, N,N-dimethyl glycine, 3-amino-3-methyl butyric and 2-amino-2-methylbutyric acid.

9. A process for the removal of $CO_2$ from a gaseous stream, which comprises contacting said gaseous stream (1) in an absorption step with an aqueous absorbing solution comprising (a) a basic salt comprising $K_2CO_3$ and (b) an activator for said basic salt comprising (i) a sterically hindered amine selected from the group consisting of N-cyclohexyl-1,3-propanediamine, $N_1$(1,2-dimethyl-2-hydroxyethyl)-2-methyl-1,2-propanediamine, 2-methylpiperazine and 2,5-dimethylpiperazine, and (ii) an aminoacid selected from the group consisting of pipecolinic acid, N,N-dimethyl glycine, 3-amino-3-methyl butyric acid and 2-amino-2-methyl-butyric acid; and (2) in a desorption and regeneration step desorbing at least a portion of the absorbed $CO_2$ from said absorbing solution.

10. The process of claim 9 wherein said sterically hindered amine is N-cyclohexyl-1,3-propanediamine and said amino acid is pipecolinic acid.

11. The process of claim 1 wherein the temperature of the absorbing solution during the absorption step is in the range of from about 25° to about 200° C., the pressures in the absorber ranges from about 5 to about 2000 psig and the partial pressure of the acid components in the feed stream ranges from about 0.1 to about 500 psia.

12. The process of claim 11 wherein the temperature of the absorbing solution during the regeneration step is in the range from about 25° to about 200° C. and at pressures ranging from about 16 to about 100 psia.

13. The process of claim 1 wherein the absorbing solution additionally includes additives selected from the group consisting of antifoaming agents, antioxidants and corrosion inhibitors.

14. The process of claim 9 wherein the temperature of the absorbing solution during the absorption step is in the range from about 25° to about 200° C., the pressures in the absorber range from about 5 to about 2000 psig and the partial pressures of the $CO_2$ in the feed stream is in the range from about 0.1 to about 500 psia.

15. The process of claim 14 wherein the temperature of the absorbing solution during the regeneration step is in the range from about 25° to about 200° C. and at pressures ranging from about 16 to about 100 psia.

16. The process of claim 9 wherein the absorbing solution additionally including additives selected from the group consisting of antifoaming agents, antioxidants and corrosion inhibitors.

17. A process for the removal of $CO_2$ from a gaseous stream containing $CO_2$ which comprises, in sequential steps, (1) contacting the gaseous stream with an absorbing solution comprising (a) from about 10 to about 40 weight percent of potassium carbonate and (b) an activator system for the potassium carbonate comprising (i) from about 2 to about 20 weight percent of at least one sterically hindered amine containing at least one secondary amino group attached to either a secondary or tertiary carbon atom or a primary amino group attached to a tertiary carbon atom, said sterically hindered amines being members selected from the group consisting of aminoethers, aminoalcohols, di- and triamines, (ii) from about 2 to about 20 weight percent of an aminoacid having 4 to 8 carbon atoms which has the capability to increase the solubility of said sterically hindered amines in alkaline aqueous conditions at elevated temperatures, and (c) the balance of said absorbing solution being comprised of water, wherein said contacting is conducted at conditions whereby $CO_2$ is absorbed in said absorbing solution and the temperature of the absorbing solution is in the range from about 35° to about 150° C. and the pressure in the absorber is in the range from about 100 to about 1500 psig; and (2) regenerating said absorbing solution at conditions whereby $CO_2$ is desorbed from said absorbing solution, wherein the regeneration takes place at temperatures ranging from about 35° to about 150° C. and at pressures ranging from about 5 to about 10 psig.

18. The process of claim 17 wherein the sterically hindered amine is selected from the group consisting of N-cyclohexyl-1,3-propanediamine, $N_1$(1,1-dimethyl-2-hydroxyethyl)-2-methyl-1,2-propanediamine, 2-methylpiperazine and 2,5-dimethylpiperazine.

19. The process of claim 18 wherein the amino-acid is selected from the group consisting of pipecolinic acid, N,N-dimethyl glycine, 3-amino-3-methyl butyric acid and 2-amino-2-methyl-butyric acid.

20. The process of claim 19 wherein the potassium carbonate content in the absorbing solution is in the range from about 20 to about 30 weight percent, the content of the sterically hindered amine is in the range from about 5 to about 15 weight percent and the content of the aminoacid is in the range from about 5 to about 15 weight percent.

21. The process of claim 17 wherein the absorbing solution additionally includes an additive selected from the group consisting of antifoaming agents, antioxidants and corrosion inhibitors.

22. The process of claim 17 wherein the absorbing solution from the regeneration step is recycled for use in the absorption step.

23. A process for the removal of $CO_2$ from a gaseous stream which comprises, in sequential steps, (1) contacting the gaseous stream with an absorbing solution comprising (a) from about 20 to about 30 weight percent of potassium carbonate, and (b) an activator system for the potassium carbonate, comprising (i) from about 5 to about 10 weight percent of N-cyclohexyl-1,3- propanediamine, (ii) from about 5 to about 15 weight percent of pipecolinic acid, and (c) the balance of the solution comprising water and additives selected from the group consisting of anti-foaming agents, antioxidants and corrosion inhibitors, wherein said contacting is conducted at conditions whereby $CO_2$ is absorbed in said absorbing solution and the temperature of the absorbing solution is in the range from about 35° to about 150° C. and the pressure in the absorber is in the range from about 100 to about 1500 psig; and (2) regenerating said absorbing solution at conditions whereby $CO_2$ is desorbed from said absorbing solution, wherein the regeneration takes place at temperatures ranging from about 35° to about 150° C. and at pressures ranging from about 5 to about 100 psig.

24. The process of claim 23 wherein the absorbing solution from the regeneration step is recycled for reuse in the absorption step.

* * * * *